(12) United States Patent
Hoh

(10) Patent No.: US 7,441,444 B2
(45) Date of Patent: Oct. 28, 2008

(54) AFM CANTILEVERS AND METHODS FOR MAKING AND USING SAME

(75) Inventor: Jan H. Hoh, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/478,394

(22) PCT Filed: Mar. 19, 2002

(86) PCT No.: PCT/US02/10137

§ 371 (c)(1), (2), (4) Date: Aug. 20, 2004

(87) PCT Pub. No.: WO02/080186

PCT Pub. Date: Oct. 10, 2002

(65) Prior Publication Data

US 2005/0011256 A1 Jan. 20, 2005

Related U.S. Application Data

(60) Provisional application No. 60/280,267, filed on Mar. 30, 2001, provisional application No. 60/314,235, filed on Aug. 22, 2001.

(51) Int. Cl.
*G12B 21/00* (2006.01)
*G01N 13/10* (2006.01)

(52) U.S. Cl. .......................... 73/105; 216/2; 250/492.1; 438/52

(58) Field of Classification Search ........... 73/104–105, 73/866; 250/492.1; 438/1, 52; 216/2; 29/592.1, 29/595; 435/4, 6
See application file for complete search history.

(56) References Cited

U.S. PATENT DOCUMENTS

| | | | |
|---|---|---|---|
| 3,327,270 A * | 6/1967 | Garrison ........................ 338/2 |
| 5,620,854 A | 4/1997 | Holzrichter et al. ............ 435/6 |
| 5,666,190 A | 9/1997 | Quate et al. ................... 355/71 |
| 5,874,668 A | 2/1999 | Xu et al. ....................... 73/105 |

(Continued)

FOREIGN PATENT DOCUMENTS

DE 198 22 634 A 11/1999

OTHER PUBLICATIONS

Akama, et al., "New scanning tunneling microscopy tip for measuring surface topography", J. Vac. Sci. Technol. A, vol. 8, No. 1, pp. 429-433, Jan./Feb. 1990.

(Continued)

*Primary Examiner*—Thomas P Noland
(74) *Attorney, Agent, or Firm*—Edwards Angell Palmer & Dodge LLP; Peter F. Corless; Jonathan M. Sparks

(57) ABSTRACT

The invention provides high performance cantilevers with optimal combinations of high resonant frequency and low force constant. In one aspect, AFM cantilevers with spring constants in the range $1\text{-}10^{-6}$ N/m with (fundamental) resonant frequencies in aqueous solutions of 0.1-100 MHz are provided. A high performance cantilever may be made by focused ion beam milling or electron deposition. The high performance cantilevers allow faster scanning, increase the temporal resolution of force measurement, improve measurement sensitivity by reducing cantilever noise, and improve sensitivity by reducing cantilever spring constant.

29 Claims, 5 Drawing Sheets

20 μm

U.S. PATENT DOCUMENTS

| | | | |
|---|---|---|---|
| 5,898,106 A | 4/1999 | Babcock et al. | 73/105 |
| 5,965,218 A | 10/1999 | Bothra et al. | 427/578 |
| 6,016,693 A | 1/2000 | Viani et al. | 73/105 |
| 6,017,618 A | 1/2000 | Gupta et al. | 428/321.1 |
| 6,087,120 A * | 7/2000 | Van Oeveren et al. | 435/23 |
| 6,163,519 A | 12/2000 | Kuroda et al. | 250/306 X |
| 6,203,983 B1 | 3/2001 | Quate et al. | 435/6 |
| 6,236,589 B1 | 5/2001 | Gupta et al. | 365/151 |
| 6,280,939 B1 | 8/2001 | Allen | 435/6 |
| 6,287,765 B1 | 9/2001 | Cubicciotti | 435/6 |
| 6,337,479 B1 | 1/2002 | Kley | 250/234 |
| 2002/0062684 A1* | 5/2002 | Adderton et al. | 73/105 |
| 2006/0213289 A1* | 9/2006 | Kjoller et al. | 73/105 X |

OTHER PUBLICATIONS

Butt, et al., "Calculation of thermal noise in atomic force microscopy", Nanotechnology, vol. 6, pp. 1-7, 1995.

Butt, "Measuring electrostatic, van der Waals, and hydration forces in electrolyte solutions with an atomic force microscope", Biophysical Journal, vol. 60, pp. 1438-1444, Dec. 1991.

Butt, et al., "Scan speed limit in atomic force microscopy", Journal of Microscopy, vol. 169, pp. 75-84, Jan. 1993.

Hansma, et al., "Biomolecular Imaging with the Atomic Force Microscope[1]", Annu. Rev. Biophys. Biomol. Struct., vol. 23, pp. 115-139, 1994, month not given.

Engel, et al., "Atomic force microscopy: a powerful tool to observe biomolecules at work", Cell Biology, vol. 9, pp. 77-80, Feb. 1999.

Heinz, et al., "Spatially resolved force spectroscopy of biological surfaces using the atomic force microscope", Elsevier Science, vol. 17, pp. 143-150, Apr. 1999.

Bustamante, et al., "Scanning force microscopy under aqueous solutions", ???? Vol. "", pp. 709-716, ??, by Mar. 2004.

Radmacher, et al., "Measuring the Viscoelastic Properties of Human Platelets with the Atomic Force Microscope", Biophysical Journal, vol. 70, pp. 556-567, Jan. 1996.

Ebbesen, et al., "Large-scale synthesis of carbon nanotubes", Nature, vol. 358, pp. 220-222, Jul. 1992.

Rief, et al., "Single Molecule Force Spectroscopy on Polysaccharides by Atomic Force Microscopy", Science, vol. 275, pp. 1295-1297, Feb. 1997.

Lee, et al., "Direct Measurement of the Forces Between Complementary Strands of DNA", Science, vol. 266, pp. 771-773, Nov. 1994.

Rugar, et al., "Force Detection of Nuclear Magnetic Resonance", Science, vol. 264, pp. 1560-1563, Jun. 1994.

Vinckier, et al., "Measuring elasticity of biological materials by atomic force microscopy", FEBS Letters, vol. 430, pp. 12-16, after Apr. 1998.

Czajkowsky, et al., "Submolecular resolution of single macromolecules with atomic force microscopy", FEBS Letters, vol. 430, pp. 51-54, after Mar. 1998.

A-Hassan, et al., "Relative Microelastic Mapping of Living Cells by Atomic Force Microscopy", Biophysical Journal, vol. 74, pp. 1564-1578, Mar. 1998.

Cappella, et al., "Force-distance curves by atomic force microscopy", Surface Science Reports, vol. 34, pp. 1-104, 1999, month not given.

Gibson, et al., "Determination of the spring constants of probes for force microscopy/spectroscopy", Nanotechnology, vol. 7, pp. 259-262, 1996, month not given.

Heinz, et al., "Reconstructing Local Interaction Potentials from Perturbations to the Thermally Driven Motion of an Atomic Force Microscope Cantilever", J. Phys. Chem. B., vol. 104, pp. 622-626, 2000, (published on web Dec. 1999).

Hutter, et al., "Calibration of atomic-force microscope tips", Rev. Sci. Instrum., vol. 64 (7), pp. 1868-1873, Jul. 1993.

Ried, et al., "6-MHz 2-N/m Piezoresistive Atomic-Force-Microscope Cantilevers with Incisive Tips", Journal of Microelectromechanical Systems, vol. 6, No. 4, pp. 294-302, Dec. 1997.

Sader, "Parallel beam approximation for V-shaped atomic force microscope cantilevers", Rev. Sci. Instrum., vol. 66, No. 9, pp. 4583-4587, Sep. 1995.

Sader, "Frequency response of cantilever beams immersed in viscous fluids with applications to the atomic force microscope", Journal of Applied Physics, vol. 84, No. 1, pp. 64-76, Jul. 1998.

Schäffer, et al., "Characterization and optimization of the detection sensitivity of an atomic force microscope for small cantilevers", Journal of Applied Physics, vol. 84, No. 9, pp. 4661-4666, Nov. 1998.

Stowe, et al., "Attonewton force detection using ultrathin silicon cantilevers", Appl. Phys. Lett., vol. 71 (2), pp. 288-290, Jul. 1997.

Viani, et al., "Fast imaging and fast force spectroscopy of single biopolymers with a new atomic force microscope designed for small cantilevers", Review of Scientific Instruments, vol. 70, No. 11, pp. 4300-4303, Nov. 1999.

Walters, et al., "Short cantilevers for atomic force microscopy", Rev. Sci. Instrum., vol. 67 (10), pp. 3583-3590, Oct. 1996.

Antonik et al., "IEEE Eng. in Med. and Biol.", vol. 16, No. 2, pp. 66-72 (Mar./Apr. 1997) "A Browser Based on Micromechanical Interrogation of Living Cells".

Dai et al., "Nature", vol. 384, pp. 147-150 (Nov. 1996), "Nanotubes as nanoprobes in scanning probe microscopy".

* cited by examiner

20 μm

20 μm

AFM CANTILEVERS AND METHODS FOR MAKING AND USING SAME

RELATED APPLICATIONS

This application claims priority under 35 U.S.C. § 119(e) to U.S. Provisional Application 60/280,267, filed Mar. 30, 2001 and to U.S. Provisional Application No. 60/314,235, filed Aug. 22, 2001, the entireties of which are incorporated by reference herein.

FIELD OF THE INVENTION

The invention relates to high performance cantilevers for scanning probe microscopes, such as Atomic Force Microscopes, and to methods of making and using the same.

BACKGROUND OF THE INVENTION

Scanning probe microscopes (SPMs) obtain data regarding surface topography by using a sharp tip or probe on the end of a cantilever held on or at a short distance (e.g., about 5-500 Å) from a sample. The cantilever tip can be deflected by various forces acting at the interface between the sample and the tip, such as electrostatic, magnetic, and van der Waals forces. A movement of the cantilever due to interactions between an atom at the end of the tip and an atom of the sample can then be measured electrically (as in a Scanning Tunneling Microscope, or STM) or optically (as in an Atomic Force Microscope, or AFM). By scanning the sample in x- and y-directions to change its position relative to the cantilever tip, three-dimensional information regarding the surface features of a sample can be obtained (see, e.g., Binnig, et al, 1986, *Phys. Rev. Lett.* 56(9): 930-933); McClelland, et al., 1987, *Rev. Progr. Quart. Non-Destr. Eval.* 6: 1307; Martin, et al, 1987, *J. Appl. Phys.* 61(10): 4723-4729).

AFM cantilevers operate in an oscillating mode or in a non-oscillating mode and can further interact with a sample in a contact mode or in a non-contact mode. In an oscillating contact mode, the cantilever is oscillated mechanically at or near its resonant frequency so that its tip repeatedly taps a sample surface, thus reducing the tip's oscillation amplitude. In an oscillating non-contact mode, interactions between the sample and the tip alter the tip's oscillation amplitude or frequency. The change in oscillation amplitude indicates proximity to the sample surface and may be used as a signal for feedback (e.g., for control of probe scanning). In a non-oscillating contact mode, the cantilever is not oscillated, and cantilever deflection is monitored as the tip is dragged over the sample surface, while in a non-oscillating non-contact mode, attractive interactions between the tip and the sample shift the cantilever resonance frequency.

Atomic force microscopy is emerging as an important tool in methods which rely on detecting information about surface features of a sample, measuring forces between two surfaces, or fabricating nanostructures (e.g., on silicon wafers, thin film magnetic read/write heads, and the like) (see, e.g., U.S. Pat. No. 6,337,479).

Atomic force microscopy also has many applications in biomedical research. It can be used for high contrast, high resolution imaging of biological surfaces in a wide range of environments (Engel, et al., 1999, *Trends Cell Biol.* 9: 77-80; Czajkowsky and Shao, 1998, *FEBS Lett.* 430: 51-4. 1998; Bustamante, et al., 1997, *Curr. Opin. Struc. Biol.* 7: 709-16; Hansma and Hoh, 1994, *Ann. Rev. Biophys. Biomol. Struct.* 23: 115-39.) It also can be used to measure intermolecular forces (e.g., Heinz and Hoh; 1999, *Trends Biotech.* 17:143-150; Mann, S. and H. E. Gaub, 1997, *Curr. Opin. Colloid Interface Sci.* 2: 145-152; Cappella and Dietler, 1999, *Surf. Sci. Rep.* 34: 1), intramolecular forces (Lee, et al., 1994; Lee, et al., 1994, *Science* 266: 771-773. 1994; Rief, et al., 1997, *Science* 275: 1295-7), and local mechanical properties (A-Hassan et al., 1998, *Biophys. J.* 74: 1564-1578; Vinckier and Semenza, 1998, *FEBS Lett.* 430: 12-6. 1998; Radmacher, et al., 1996, *Biophys. J.* 70: 556-567). Imaging with AFM offers advantages for studying biological samples, because the samples do not require drying, sectioning, metal coating or chemical fixing prior to analysis. Thus, AFMs may be used with samples that require very little sample preparation, including samples that are biologically active in both ambient air (including dried samples) and liquid.

One of the limiting elements in current AFMs is the design of the cantilever. The performance of the cantilever is primarily constrained by a combination of its fundamental resonant frequency ($\omega$) and spring constant (k). Typical cantilevers of the prior art are on the order of 85-500 µm long and have resonant frequencies substantially less than 500 KHz. For example, generally, prior art cantilevers have lengths on the order of 85-320 µm, widths of 10-20 µm and thicknesses on the order of 0.5 µm. This produces typical [k, $\omega_s$] pairs of [0.5 N/m, 30 kHz] for shorter cantilevers, and [0.01 N/m, 2 kHz] for the longer cantilevers (where $\omega_s$ is the fundamental resonant frequency in solution).

Smaller cantilevers with higher resonant frequencies are desirable because they allow faster imaging rates and permit the cantilever tip to more closely track sample topography (see, e.g., Butt, *Biophys. J.* 60: 777-785). Smaller cantilevers also are less affected by viscous damping, and are therefore more sensitive (see, e.g., U.S. Pat. No. 6,016,693). Smaller cantilevers have been described in Walters, et al., 1996, *Rev. Sci. Instrum.* 67: 3583-3590 (23 µm length); Walters, et al., 1997, *SPIE, Proceedings Micro-Machining and Imaging* 3009: 48 (26 µm length); and Schaeffer, et al., 1997, *SPIE, Proceedings Micro-Machining and Imaging* 3009: 48 (9 µm length).

A number of groups have made efforts to generate high performance cantilevers. Stowe, et al., 1997, *Appl. Phys. Lett.* 7(1): 288-290, describe ultrathin (60 nm) silicon cantilevers with force constants on the order of $10^{-6}$ and resonant frequencies in vacuum of 1.7 kHz. While the performance of these cantilevers in solution was not examined, the dimensions of the cantilevers are such that they have a predicted resonant frequency in water of about 200 Hz. This frequency is too low to be useful in most biological applications. Ried, et al., 1997, *J. Microelectromechanical Sys.* 6: 294-302, describe piezo resistive cantilevers with resonant frequencies of 6 MHz and spring constants of 2 N/m. However, these types of cantilevers have relatively poor detection sensitivity and are difficult to work with in solution, preventing them from being used productively in biological research. Such cantilevers are used instead in data storage applications (see, e.g., Mamin and Rugar, 1996, *Appl. Phys.* 79: 5644-5644) or in force-based magnetic resonant imaging (Rugar et al., 1994, *Science* 264: 1560-1563).

High performance cantilevers specifically for use in biological research have been described (Walters et al., 1996, *Rev Sci Instrum* 67:3583-3590; Viani, et al., 1999, *Rev. Sci. Instrum.* 70: 4300-4303). The best cantilevers thus far developed have resonant frequencies of 100-200 kHz in solution and spring constants of 0.1-0.2 N/m. However, improvements in these cantilevers are largely limited by the lithographic and thin film deposition methods used for their fabrication.

U.S. Pat. No. 6,016,693 discloses a method for making a smaller cantilever (e.g., 2-10 µm in length). The method comprises fabricating a "sacrificial cantilever" of SiO$_2$ and depositing a layer of material which will form the final cantilever onto the sacrificial cantilever. The sacrificial cantilever is then etched away.

U.S. Pat. No. 5,666,190 discloses a compound cantilever for a scanning probe microscope which includes a bending portion and a vibrating portion. The vibrating portion has a lower mechanical resonant frequency than the bending portion. The cantilever is fabricated from two fused silicon oxide wafers.

SUMMARY OF THE INVENTION

The invention provides high performance cantilevers for Atomic Force Microscopes (AFMs), as well as methods for making and using the same. In one aspect, the invention provides a cantilever with resonant frequencies in the range of 1-100 MHz in solution for cantilevers with a spring constant of 0.1 N/m. At the high end, this resonant frequency is approximately one to three orders of magnitude better than the best cantilevers that are currently available.

In one aspect, the invention provides a cantilever for use in a scanning probe microscope comprising a width to thickness ratio of about 3:1 or less and which is smaller in at least one dimension than about 5 μm. More preferably, the cantilever comprises a width to thickness ratio of about 1:1 or less.

In another aspect, the invention provides a cantilever for use in a scanning probe microscope whose resonance frequency is reduced by less than 70% in solution compared to its resonance frequency in air.

In a further aspect, the invention provides a cantilever for use in a scanning probe microscope, wherein the body of the cantilever comprises a carbon nanotube.

Preferably, the cantilevers have a resonant frequency equal to or above 10 kHz. More preferably, the cantilevers have a resonant frequency equal to or above 100 kHz.

Cantilevers may be fabricated from a variety of materials, including, but not limited to silicon, silicon nitride, silicon dioxide, a metal (e.g., gold, aluminum, silver, or nickel), a plastic, and a silicon-based rubber (e.g., PDMS). The metal gold, aluminum, silver and nickel.

In one aspect, the cantilever comprises a reflective portion. In another aspect, the cantilever comprises a conductive material.

The invention also provides a method for producing a cantilever comprising providing a starting material; exposing the starting material to an ion beam; and removing molecules from the starting material to generate a cantilever which has a width to thickness ratio of about 3:1 or less and which is smaller in at least one dimension than about 5 μm.

The invention further provides a method for producing a high performance cantilever comprising: providing a starting material; exposing the starting material to an electron beam; and depositing molecules on the starting material to generate a cantilever which has a width to thickness ratio of about 3:1 or less and which is smaller in at least one dimension than about 5 μm.

In one aspect, the methods further comprise the step of imaging the starting material at one or more time intervals. The starting material may comprise silicon, silicon nitride, silicon dioxide, or a metal. The method can be used to generate cantilevers comprising a resonant frequency above at least about 10 kHz, and preferably, above at least about 100 kHz. The cantilever may comprise a spring constant of about $1\text{-}10^{-6}$ N/m.

Starting materials may comprise materials of a variety of shapes. For example, the starting material may be a beam, a film, a sheet, a V-shaped material, or a rectangular shaped material. In one aspect, the starting material is itself a cantilever.

In one aspect, a tip is generated at the end of the cantilever. For example, a tip may be fabricated using electron beam deposition.

In one aspect, the cantilevers produced by the methods described above comprise a conductive material.

The invention also provides a method of measuring the property of a cantilever comprising measuring the deflection of any of the cantilevers described above.

The invention further provides a method for measuring a property of a sample, comprising: detecting an interaction between a cantilever according to the invention and a sample, wherein the interaction provides a measure of the property of the sample. The property may comprise one or more surface features of the sample. In one aspect, the cantilever further comprises one or more biological molecules and the one or more biological molecules interact with one or more molecules of the sample. In another aspect, the biological molecule binds to the one or more molecules. In a further aspect, the one or more biological molecules is selected from the group consisting of: nucleic acids, proteins, polypeptides, peptides, receptors, ligands, enzymes, antigens, drug molecules, therapeutic agents, lipids, lipid bilayers, detergents, a cell membrane fraction, organelles, and zwitterions. The sample may comprise one or more of: a cell, nucleic acids, proteins, polypeptides, peptides, receptors, ligands, enzymes, antigens, drug molecules, therapeutic agents, lipids, a cell membrane fraction, organelles, and microorganisms.

The invention additionally provides a method for fabricating a nanostructure comprising: providing a substrate comprising a plurality of molecules; and using a cantilever as described above to move one or more molecules on the substrate to a desired position on the substrate. In one aspect, the cantilever is used to create a data structure on the substrate.

BRIEF DESCRIPTION OF THE FIGURES

The objects and features of the invention can be better understood with reference to the following detailed description and accompanying drawings. The drawings are not to scale.

FIG. 1A shows a 12 μm long cantilever grown off the end of a starting material which is a microfabricated silicon nitride cantilever. FIG. 1B shows a 1.5 μm long cantilever grown near the apex of the tip of a silicon starting material which can be interrogated through motions of the starting material. FIG. 1C shows a cantilever grown offend of silicon nitride starting material with a pad constructed in the middle The pad was constructed by depositing 4-5 electron beam "spikes" parallel to the plane of the silicon nitride starting material.

FIGS. 2A-C illustrate steps in an FIB process to produce an optimal high performance cantilever according to one aspect of the invention. FIGS. 2D and E are scanning electron micrographs (SEMs) of ion beam modified cantilevers. FIG. 2D shows an SEM of cantilever 1 from, Example 1, Table 2. The two legs of the cantilever are 0.75 μm wide and 21 μm in length. The reflective pad is 15.0 μm long and 20.0 μm wide. FIG. 2E is a scanning electron micrograph of cantilever 3 from, Example 1, Table 2. The legs of cantilever 3 are approximately 20 μm in length and 1.2 μm in width. The dashed line shows the size of the original pad. FIGS. 2F and G show a power spectrum of cantilever 1 in air and water. The fundamental resonant frequency is 127 kHz in air and 51 kHz in water. In both cases, there is a low frequency peak centered at f=0 associated with 1/f and other electronic noise. FIGS. 2H-I show the thermal noise of cantilevers in water from 100 Hz-10 kHz. FIG. 2H shows a conventional E Microlever cantilever, while FIG. 2I shows the thermal noise of cantilever 1.

DETAILED DESCRIPTION

Figure 1A:
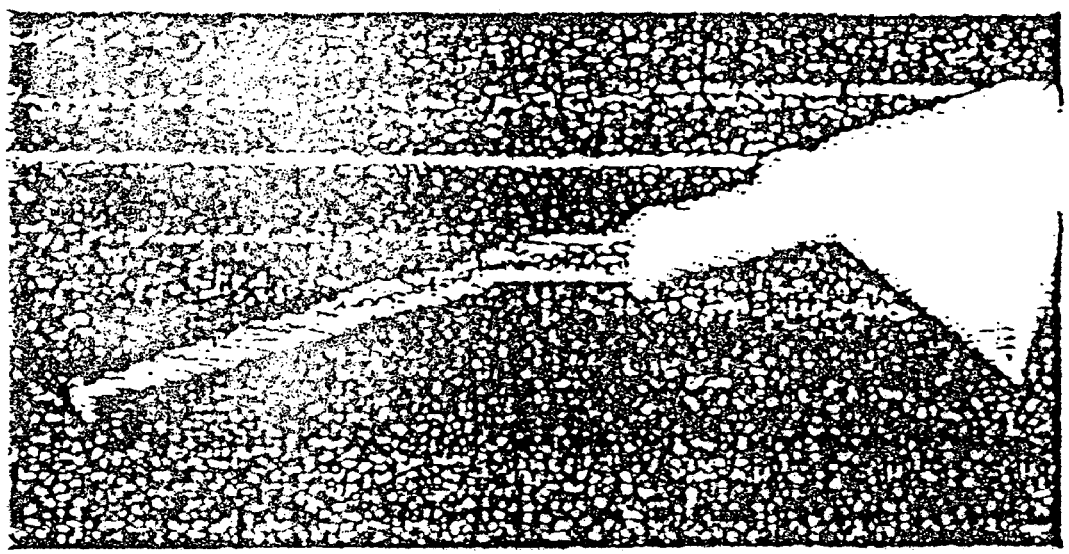
FIGS. 1A-C show scanning electron micrographs of compound cantilevers, produced by electron beam deposition according to one aspect of the invention.

The invention provides high performance-cantilevers with optimal combinations of high resonant frequencies and low force constants. In one aspect, AFM cantilevers with spring constants in the range 1-0.01 N/m, and preferably in the range of $0.1$-$10^{-6}$ N/m, with (fundamental) resonant frequencies in aqueous solutions of 1-100 MHz are provided. In one aspect, a high performance cantilever according to the invention is generated by modifying a starting material by focused ion beam milling to remove molecules from the starting material to generate a geometry which minimizes damping of resonant frequency in solution. As an alternate, or additional approach, electron beam deposition methods are used to add molecules to starting materials to provide this geometry.

Preferably, the cantilevers have a width to thickness ratio which is less than about 3:1 and more preferably, is about 1:1. More preferably, the cantilevers have at least one dimension which is smaller than about 5 μm. The high performance cantilevers according to the invention allow faster scanning, increase the temporal resolution of force measurement, improve measurement sensitivity by reducing cantilever noise, and improve sensitivity by reducing the cantilever spring constant.

Definitions

The following definitions are provided for specific terms which are used in the following written description.

As used herein, a "cantilever leg" refers to a portion of a cantilever extending from its base or supported end.

As used herein, a "cantilever tip" refers to the portion of the cantilever for interacting with a sample.

As used herein "a biological molecule" refers to a molecular derived from a cell or organism, which may be produced by a cell or organism or which is a synthetic or mutated or modified copy of such a molecule.

As used herein, "a biological molecule which interacts with one or more molecules" of a sample refers to a biological molecule whose contact with one or more molecules in a sample causes a measurable change in the property of a sample, as determined in an assay suitable for measuring the property.

As used herein, "proximity" refers to within about 100 nm of a sample.

High Performance Cantilevers

With all other things being equal, the higher the resonant frequency of an AFM cantilever the better its performance. A high resonant frequency has several benefits. For example, in contact mode imaging, a high frequency allows a cantilever tip to more closely track sample topography (see, e.g., Butt, et al., 1993, *J. Microsc.* 169: 75-84). In AC imaging modes, imaging speed is limited by a combination of the resonance quality factor (Q) and the resonant frequency. Thus, for any given Q, the higher the resonant frequency, the faster the feedback, which in turn allows for faster imaging. There are corresponding benefits in force measurements. Higher resonant frequencies allow for better temporal resolution (see, e.g., Butt and Jaschke, 1995, *Nanotechnology* 6: 1-7). In general, cantilevers with higher resonant frequencies produce measurements less affected by background in a given bandwidth because thermal noise is spread over a greater frequency range (Walters, et al., 1996, *Rev. Sci. Instrum.* 67: 3583-3590; Viani, et al., 1999, *Rev. Sci. Instrum.* 70: 4300-4303).

For cantilevers used to evaluate biological samples, it is also particularly desirable to use lower spring constants so that less force is imparted on the sample, e.g., to minimize sample destruction.

Basic Cantilever Design

There are two common cantilever geometries, diving boards or rectangular cantilevers, and V-shaped cantilevers. The diving board is a simple end-supported beam and thus the spring constant is given by $$k_{Beam} = \frac{Ewt^3}{4l^3} \qquad (1)$$

where w is the width of the cantilever, t is the thickness of the cantilever, l is the length of the cantilever and E is the elastic modulus of the cantilever material.

V-shaped cantilevers can be modeled using a double beam approximation, although for short cantilevers, where the width becomes significant relative to the length, this approximation fails (Sader, 1995, *Rev. Sci. Instrum.* 60: 4583-87). However, the resonant frequency for a simple V-shaped beam in vacuum (and to a good approximation in air) is given by:

$$\omega_{Beam} = \frac{t}{2\pi l^2} \sqrt{\frac{E}{\rho_C}} \qquad (2)$$

where $p_C$ is the cantilever material density or, for a composite beam, $p_C$, is the average density of the beam.

There is a significant reduction of the resonant frequency of a cantilever when it is placed in solution (Sader, 1998, *J. Appl. Phys.* 84:64-76; Butt et al., 1993, supra, Schaeffer, et al., 1996, supra). A simple relationship for a beam having either a diving board or V-shaped configuration that gives reasonably good agreement with experimental values (at the fundamental frequency) is $$\frac{\omega_s}{\omega_v} = \left[1 + \frac{\pi \rho_F w}{4 \rho_C t}\right]^{-1/2}, \qquad (3)$$

where $p_F$ is the density of the fluid in which the cantilever is immersed, and $\omega_s$ and $\omega_v$, refer to resonant frequencies in solution and vacuum respectively (Chu, W.-H., 1963, *Tech. Rep. No.* 2, DTMB, Contract Nos.-86396(X), Southwest Research Institute, San Antonio, Tex.). For most presently used cantilever geometries, this ratio is approximately 0.25, resulting in a four-fold drop in the resonant frequency when they are used in solution.

Equations (1)-(3) can be used to derive the design parameters of optimally performing cantilevers. For example, to achieve high frequency, cantilevers need to be short or thick, while low spring constant cantilevers should be long or thin. To improve both resonant frequency and provide a lower spring constant, cantilevers must be short and thin. For a cantilever that operates in air, a 10-fold reduction in length and a 10-fold reduction in thickness keeps the spring constant the same while increasing the resonant frequency by a factor of 10. On the other hand, a 10-fold reduction in thickness and a 3-fold reduction in length keeps the resonant frequency close to constant while reducing the spring constant by approximately 30-fold. Thus, the exact desired dimensions of a cantilever will depend on whether spring constant or resonant frequency is being optimized.

An important feature of cantilever design identified herein is to optimize cantilever geometry. From equation 3, it can be shown that for an appropriate combination of cantilever width and thickness, the reduction of resonant frequency in solution can be virtually eliminated. For example, for a silicon nitride cantilever with a width to thickness ratio of 1, $\omega_s$ is 0.9 times that in vacuum. Thus, while cantilever width has no effect on $\omega_v$, decreasing the width effectively increases $\omega_s$. In addition to the change in $\omega_s$, the spring constant decreases linearly with the width. The cantilevers of the present invention take advantage of these property changes that occur when cantilever geometry is optimized, i.e., such as when cantilever widths are minimized.

Therefore, in one aspect, a cantilever geometry is selected which reduces the damping of the cantilever's resonant frequency in solution. Preferably, the resonant frequency of the cantilever is reduced by less than 75% of the resonant frequency in air. More preferably, the resonant frequency is reduced by less than about 70%, less than about 65%, less than about 60%, less than about 55%, less than about 50%, less than about 45%, less than about 40%, less than about 35%, less than about 30%, less than about 25%, less than about 20%, or by less than about 15% of the resonant frequency in air.

One way in which this reduction in damping is achieved is by producing a cantilever whose body has a cross-section of about 10:1 or less, about 5:1 or less. More preferably, the ratio is about 3:1 or less. Still more preferably, the width to thickness ratio is about 2:1, about 1.5:1, and most preferably, about 1:1 or less. In one aspect, the size of the cantilever in at least one dimension is less than about 5 µm (e.g., about 4.0 µm, about 3.0 µm, about 2.0 µm, about 1.0 µm, about 0.5 µm, about 0.2 µm, about 0.1 µm, about 0.05 µm or less).

Materials for fabricating cantilevers can vary. However, in one aspect, a cantilever should be least partially reflective so as to enable its use in a laser-based detection scheme such as optical beam deflection (OBD) or interferometry. Generally, silicon is a material with suitable reflectivity when the thickness of the cantilever is chosen to equal about a quarter of the wavelength produced by laser being used for detection. For example, the reflectivity of a 50 nm thick silicon membrane illuminated with 670 nm laser light and immersed in water is approximately R=0.6. However, a metal, such as gold, silver, aluminum, or nickel, also may be used to generate a cantilever with suitable properties (see, e.g., U.S. Pat. No. 6,016,693). Additional materials such as $SiO_2$ or $Si_3N_4$ may be used.

In another aspect, a cantilever material is selected which is conductive. For example, the cantilever, is silicon, a carbon nanotube, or a metal.

Other materials for cantilevers can be selected which maximize the flexibility and/or width to thickness ratios and/or performance properties (e.g., maximize resonance frequencies, minimize spring constants, minimize noise and the like).

In one particularly preferred embodiment, the body of the cantilever comprises a carbon nanotube. Carbon nanotubes are macro-molecules of carbon, analogous to a sheet of graphite, however, rolled into a cylinder. In such a coiled geometry, the carbon arrangement becomes very strong. Being one giant molecule, carbon nanotubes have unusual mechanical and electrical properties. The conductivity of single wall carbon nanotubes can vary from semi-conductive to metallic depending on the chiral angle of the tube and its diameter.

Methods for Making Cantilevers

The design parameters described herein enable the fabrication of high performance cantilevers. It should be obvious to those of skill in the art that the exact method for producing a cantilever with the parameters described above (e.g., width to thickness ratio which minimizes damping, such as a ratio of about 3:1 or less) may vary and that new methods of fabrication may evolve to achieve such parameters. All such methods are encompassed within the scope of the invention.

In one aspect, a suitable starting material is selected and molecules are added to or removed from the material to produce a structure having the dimensions described above. Preferably, the starting material is silicon, silicon dioxide, silicon oxide, silicon nitride, or a metal (e.g., gold, silver, aluminum, nickel) which comprises a base or end for supporting or mounting during the fabrication process. The starting material also can be a silicon-based rubber such as polydimethylsiloxane or PDMS, or even plastic.

The starting material can be a variety of shapes, e.g., a film, a sheet, a beam, a brick, a cube, a polygon, a v-shaped material, rectangular shaped material, an irregularly shaped material, and the like. The starting material can even be a conventional cantilever. In one aspect, molecules are removed from the starting material by exposing the starting material to an ion beam. In another aspect, molecules are added to the starting material by exposing the starting material to an electron beam. Lithographic techniques may also be used.

In part, methods of fabricating cantilevers will depend on the nature of the starting material. For example, cantilevers comprising carbon nanotubes can be fabricated using chemical vapor deposition process to grow nanotubes of controlled length and diameter. Depending on the growth process, the length of the tubes can be from approximately 100 nanometers to several microns. Diameters can vary from 1 to 20 nanometers. In one preferred aspect, the body of a carbon nanotube cantilever is about 1-10 nm in diameter, more preferably, from about 1 to 5 nm in diameter, and still more preferably, about 2 nm in diameter.

The carbon arc method (Ebbesen and Ajayan, 1992, *Nature* 358: 220-222) can be used to generate a carbon nanotube. This method creates nanotubes through the arc-vaporization of two carbon rods placed end to end which are separated by about 1 mm. A direct current of 50 to 100 A driven by approximately 20 V creates a high temperature discharge between the two electrodes. The discharge vaporizes one of the carbon rods and forms a small rod shaped deposit on the other rod. Producing nanotubes in high yield depends on the uniformity of the plasma arc and the temperature of the deposit form on the carbon electrode.

The laser vaporization method produces single-wall carbon nanotubes in high yields. In this method, a graphite target is heated to 1200° C. in a quartz tube. A Nd-YAG laser ablates carbon off of the graphite target. Soot from the ablation process contains a high percentage of single wall carbon nanotubes.

AFM techniques additionally, or alternatively, can be used to produce and/or refine the geometry of a carbon nanotube.

Focused Ion Beam Milling

As noted above, fabrication of AFM cantilevers is presently largely limited by the optical methods available for the lithography and the technical difficulties of producing beams with widths or lengths smaller 2 μm. To overcome these limitations, in one exemplary aspect, the invention uses ion beam and electron beam methods to produce cantilevers that have dimensions of 10's of nanometers in at least one axis.

Focused ion beam (FIB) milling is a technology which has been widely used in the semiconductor and materials science fields. It is essentially the reverse of sputtering, where an ionized gas (often argon) is accelerated with relatively low energies (100's to 1000's of eV) against a surface. These ions dislodge material at the surface, thereby etching it. In simple terms, it might be thought of as an atomic sandblaster. By using focused ion beams, etching can be extremely local.

FIB is routinely used to modify surfaces on a length scale of <16 nanometers (Johnson, 1984, In *Ion Bombardment Modification Of Surfaces*, Auciello and Kelly (eds) Elsevier Publishers B. V) and is probably most widely used for "editing" semiconductors. However, it also is commonly used by material scientists to "cut" thin sections (50 nm) of extremely hard materials for transmission electron microscopy. FIB has been used in atomic force microscopy to modify AFM tips to produce very high aspect ratio tips for imaging trenches and other deep structures, but has not be used to produce the body of a cantilever.

In one aspect, the invention provides a method for constructing a cantilever with a high resonant frequency which comprises using a scanned beam etching technique, such as FIB milling, to produce the body of the cantilever. Initially, a desired spring constant is selected. For example, cantilevers with spring constants in the range 0.01-0.5 N/m have been successfully used in a wide range of biological experiments. Therefore, preferably, a cantilever is designed which provides a force constant of approximately 0.01 N/m. More preferably, the cantilever also has a resonant frequency of at least about 0.1-100 MHz.

The method comprises providing a starting material and exposing the starting material to an ion beam from an ion source. A suitable ion source can comprise a liquid metal ion source (e.g., a Gallium or Indium source). Preferably, the source comprises a relatively high intensity (e.g., approximately $10^6$ A/cm$^2$sr) and a small emission area (approximately 10 nm). A small emission area permits strong focusing of the ion beam by an optical system integrated with the ion source.

Preferably, the ion beam source comprises a column in which ions are generated, accelerated and focused (e.g., by electrostatic lenses). In one aspect, the ion beam source communicates with a high vacuum chamber comprising a stage on which the first cantilever can be mounted. Suitable ion beam workstations include the FEI 610 focused ion beam workstation or FEI 200 focused ion beam instrument (FEI, Hillsboro, Oreg.).

Preferably, the beam energy from the ion source is from about 10 to about 50 kV, and the spot size is less than about 100 nm. More preferably, spot size is less than about 10 nm. The ion beam current may range from about 1 to about 150 pA. Ion densities are within the range of about 1-20 A/cm$^2$.

Sputter erosion of the starting material by the ion source enables local removal of material from the starting material. A single beam can be operated in an imaging mode by using a low beam intensity. In the imaging mode, material to be removed is identified. In one aspect, imaging of the cantilever is performed by monitoring secondary electrons generated during the sputtering process. Their production can be monitored means of a secondary electron detector and used to produce an image. Thus, high-resolution ion-beam induced secondary electron images can be generated which can be used to monitor the fabrication process.

The intensity is then increased and ion beam is used to etch away the appropriate material. The structure is then imaged again to verify the suitability of the new structure. Generally, a cantilever can be milled in about 10 to 100 minutes using the method according to the invention. However, etch rates may vary depending on the material chosen for the cantilever. For example, for silicon nitride, typical etch rates are on the order of 5 μm$^3$/s.

As with conventional ion beam milling, the process of removing molecules from the starting material can be implemented using a processor in communication with the ion beam and with an image detector which detects secondary electrons or other imaging data generated by the starting material being milled. Preferably, the processor is also in communication with a work station with which a user can interface. In one aspect, by placing a stylus on a display of the work station (e.g., a monitor of a standard computer) which displays an image of the starting material, the user draws a particular shape or geometry to be milled and the processor uses this information to control the milling process (e.g., by controlling beam energy, beam direction, and the like).

Generally, the beam can be focused anywhere along the length of the starting material. In one aspect, the starting material is held or mounted at one end (e.g., its base) to a support (e.g., such as a glass slide) and the ion beam is focused anywhere along the length of the material distal from the base to mill at least a portion of the starting material to a geometry which minimizes damping in solution of the cantilever's resonant frequencies as described above (e.g., providing a width to thickness ratio of about 3:1, and preferably, about 1:1). Preferably, the ion beam mills a structure of a desired geometry at a distance from the base which permits light at an angle from about 1° to 180°, preferably, from about 10°-100°, and more preferably, from about 20-90°), to be reflected from the surface of the desired structure.

Figure 2A:
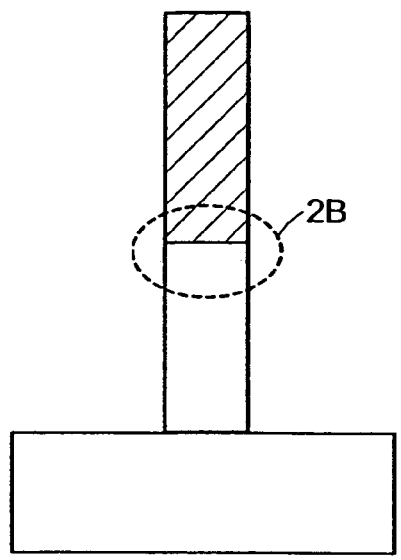
FIGS. 2A-2I show a method of making a cantilever using an FIB process and the properties of cantilevers produced by the method.
Figure 2B:
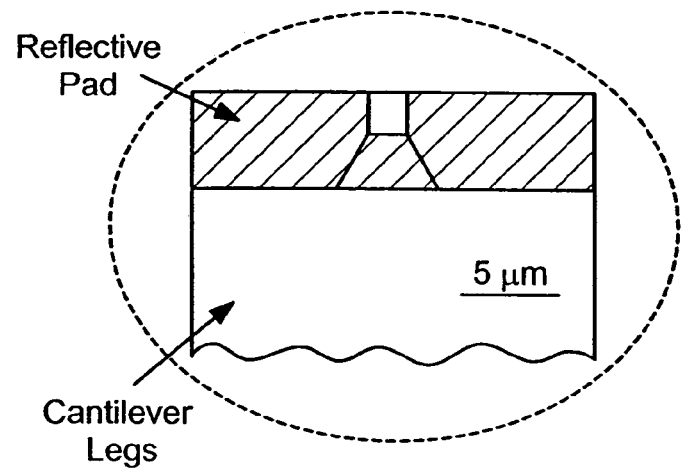
Figure 2C:
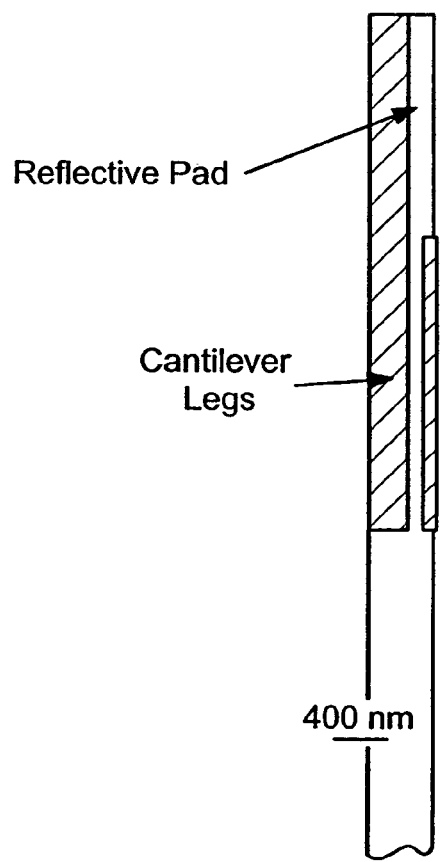

In one aspect, the cantilever has one or more legs. Legs can be of a variety of dimensions. For example, the legs of the second cantilever may be about 100 nm thick, 100 nm wide and 3 μm long. Preferably, the spring constant of the second cantilever is about 0.1 N/m while the resonant frequency of the cantilever in solution is about 10 MHz. FIGS. 2A-C show a schematic of one exemplary cantilever design, and the milling steps performed to construct it.

As shown in FIGS. 2A-C, a conventional diving board AFM silicon nitride cantilever from ThermoMicroscopes can be used as a starting material. This cantilever is 200 μm long, 20 μm wide, and 600 nm thick, and has a sputtered gold reflective surface. It is also tip-less (however, the method shown applies equally well to cantilevers comprising tips). However, in general, the approach shown in the Figure may be used with any type of starting material which need not be a cantilever.

In the aspect shown in FIG. 2A, the starting material is cut approximately in half, removing material (shaded in the Figure) in order to make the starting material stiffer (preferably, to about 10 N/m). As shown in FIG. 2B, the front portion of the starting material is then milled to produce an approximately 2 μm×2 μm rectangle attached to the starting material by two legs that are about 100 nm in diameter, again removing material indicated by shading in the Figure. As shown in FIG. 2C, the milled starting material is then turned on its side and the legs are first thinned on top, removing the reflective gold coating which is very dense and hence contributes disproportionately to the second cantilever's effective mass. The legs are then thinned on the bottom side to a thickness of about 100 nm. Preferably, the underside of the reflective pad is also be thinned by about a few hundred nanometers, to reduce the effective mass and improve the resonant properties of the newly formed cantilever.

Although in the Figures, a conventional cantilever is used as the starting material, as discussed above, many other starting materials can be used (e.g., thin films, sheets, bricks, beams, and the like of silicon, silicon nitride, silicon dioxide, metals, plastic, etc.).

In another aspect, a cantilever with legs of about 40 nm in width, about 40 nm thick and about 900 nm length is produced, thereby generating a cantilever with a spring constant of 0.1 N/m and resonant frequency in solution of about 60 MHz.

Preferably, cantilevers according to the invention have resonant frequencies in the range of about 0.1-100 MHz in solution. More preferably, resonant frequencies are above 10 MHz. In one aspect, the spring constants of the cantilevers range from about $1$-$10^{-6}$ N/m with (fundamental) resonant frequencies in aqueous solutions of 0.1-100 MHz. Cantilevers having legs with a thickness of about 100 nm or less and widths of about 100 nm can be produced. It should be obvious to those of skill in the art that the exact dimensions of the cantilever can be varied by a user to achieve selected criteria, such as desired resonant frequencies and spring constants.

Low spring constant cantilevers are extremely appealing for their potential application to biological systems. As noted earlier, low force constants are likely to be less destructive for imaging of biological samples and more sensitive in force measurements. In terms of fabricating these cantilevers by focused ion beam milling, the approach is to achieve the spring constant desired while maintaining as high a resonant frequency as possible. In one aspect, this is achieved by increasing the length of the legs while keeping the leg width and thickness as small as possible. For example, a beam 25 μm long, with legs that 100 nm thick and 100 nm wide, would have a spring constant of $2 \times 10^{-4}$ N/m and a resonant frequency in solution of about 150 kHz. For 100 μm long legs, this becomes $3 \times 10^{-6}$ N/m and 10 kHz. For the fabrication of these long legs, a V-shaped starting material (e.g., such as a V-shaped cantilever) may be used as the starting material.

In some cases, it may not be necessary to truncate the starting material. For example, a thicker starting material can be selected (e.g., about 2 μm) and can be used to provide a starting material that is sufficiently stiff even at full length (e.g., by custom fabrication of a wafer of silicon nitride). Alternatively, where a lower resonant frequency is acceptable, a softer starting material may be selected (e.g., such as plastic or a silicon-based rubber such as PDMS).

In a preferred aspect, the cantilever formed from the starting material has a small reflective pad at a portion of the starting material distal from the base (e.g., such as at the end of the starting material) to enable imaging of cantilever deflections. The pad end loads the leg, while the mass of the leg is distributed along its length. Thus, the pad acts as a large end-loaded mass that significantly reduces the resonant frequency of the cantilever. For a uniform straight beam, the effective end-loaded mass is 0.25 times the total mass. The resonant frequency scales with $m^{-1/2}$, where m is the end-loaded mass, so the pad reduces the resonant frequency by a factor of ~10. The reflective pad also dominates the hydrodynamic properties of the cantilever in solution, further degrading performance. For example, the mass of the pad may be approximately 100 times that of the effective mass of the legs.

From a design standpoint, the size of the reflective pad must be large enough to reflect sufficient light from a conventional optical lever, however, small enough to preserve desired performance properties of the cantilever. Based on dimensions of conventional cantilevers, a pad of about 10 μm×10 μm is adequate.

Treating the pad as a mass end loading one of the legs as described above, the expected resonant frequency drop is from about 10 MHz to about 2 MHz. In use, an additional reduction of the frequency of approximately 2-fold to about 1 MHz will occur due to damping in solution. However, this is still a dramatic improvement over presently available cantilevers with similar spring constants that have resonant frequencies in solution of order 10 kHz. 1 MHz is also well within the detection bandwidth of many commercial AFMs, such as the Nanoscope III from Digital instruments. The smallest pad that will produce sufficient reflection is on the order 2 μm×2 μm.

Electron Beam Deposition for Generating Cantilevers

In another aspect, the invention provides a method for fabricating a high performance cantilever by electron beam deposition. It has long been known to electron microscopists that focusing an electron beam at one position will produce "contamination." This contamination results from the ionization and polymerization of surface diffusing pump oil. This was apparently first exploited in scanned probe microscopy to produce tips for scanning tunneling microscopy (Akama et al., 1990, *J. Vac. Sci. Technol. A*8: 429-433). Subsequently Keller and Chou, 1992, *Surf. Sci.*, 268: 333-339, and Ximan and Russell, 1992, *Ultramicrosc.* 42: 1526-1532, demonstrated that very sharp and high aspect ratio AFM tips could be produced by depositing an "e-beam" tip on the pyramidal tip of a conventional AFM cantilever. These are now widely used in biological research.

In contrast to the prior art, the present invention uses e-beam methods to produce the body of an AFM cantilever by growing e-beam material (e.g., such as hydrocarbons or silicon) on a starting material (e.g., such as those described above). Generally, molecules from the e-beam can be deposited anywhere along the starting material (e.g., parallel to a plane of the starting material, at an end of the starting material, etc.). As with ion beam milling, the fabrication process is monitored at different time intervals until a suitable geometry and/or dimensions are achieved and can be controlled using a processor in communication with an electron beam source and a work station.

In one aspect, a starting material is mounted on a support or mount (e.g., such as a glass substrate) and e-beams are used to grow a cantilever at the end of a starting material which is pointed toward the electron beam source of a standard scanning electron microscope (SEM). The beam may be adjusted to accommodate mechanical drift in the microscope used and can be refocused periodically to maintain a small spot at the growing end of the cantilever. The cantilever grown may have a varying diameter so as to form a slight taper, however, in one preferred embodiment, tapering is minimized by more frequent refocusing of the electron beam and/or by minimizing surface diffusion of activated molecules out of the irradiation volume. E-beam structures can be produced using high performance field emission SEMs as are known in the art.

The resonant frequency of cantilevers so formed is very high and can be estimated using the formula: $\omega = (k/m^*)^{1/2}$, where m* is the effective mass. This is another form of equation (2), that does not require explicit values for the material modulus.

Figure 1B:
Figure 1C:
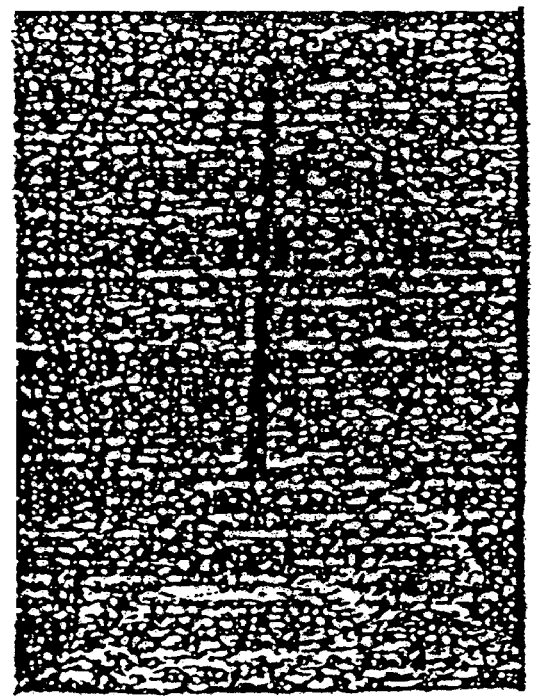

Suitable materials for cantilevers include those with elastic moduli on the order of 100 Gpa, such as crosslinked polymers, silicon, or silicon nitride (see, e.g., FIGS. 1A-C). Pads may be constructed on the starting material by depositing electron "spikes" parallel to the plane of the starting material and in close proximity to each other (See, e.g., FIG. 1C).

Tips of cantilevers generated by ion beam milling or by electron deposition can be fabricated by means known in the art. In one aspect of the invention, electron beam deposition is used to fabricate a tip at the end of a cantilever formed by ion beam milling. Tips may also be adhered to the end of a cantilever distal from the base, although this is less optimal as the size of the cantilever decreases.

In fabricating cantilevers, the design of the tip may be optimized to optimize the coating characteristics of the tip. For example, it may be preferable to make the tip more blunt than in a standard cantilever. The surface of the tip may additionally be chemically modified using different silanes or surface modifiers as are known in the art. Alternatively, where a conventional cantilever is used as the starting material to generate a high performance cantilever, the tip of the first cantilever in the compound cantilever may be left intact during the fabrication process.

Physical properties of the high performance cantilevers generated can be evaluated can include but are not limited to, one or more of: resonant frequencies, spring constants, Q value, and noise characteristics.

Resonant frequencies can be measured directly from power spectra of cantilever noise measurements as is known in the art. Spring constants can be determined from thermal noise data, by fitting the resonant peak (Hutter and Bechoder, *Rev. Sci. Instrum* 64: 1868-1873. 1993) or by simply evaluating the RMS amplitude. Butt and Jaschke, *Nanotechnology* 6: 1-7, 1995, also describe methods for determining thermal noise. Sader also describes methods for determining resonance frequencies and/or spring constants (see, e.g., Sader, *Rev. Sci. Insrum.* 60: 4583-87: 1995.

Q values also may be measured using means known in the art (see, e.g., Stowe et al., 1997, supra). This is particularly preferred for AFM application such as tapping mode imaging in air/vacuum environments where feedback times are in part limited by cantilever Q's.

AFM Microscopes for Small Cantilevers

The generation of very small cantilevers offer a number of advantages as described above. Preferably the cantilevers are used in a microscope with a large bandwidth. Schaeffer and Hansma, 1999, *J. Appl. Phys.* 84: 4661-4666, and Viani, et al., 1999, supra, report an AFM specially designed for working with small cantilevers. This microscope is different from conventional AFMs in that it allows the detection laser to be focused to a nearly diffraction limited spot onto a cantilever, enabling sufficient reflection from the cantilever. This microscope is based on an optical lever detection system with a diode laser for reflecting light off a cantilever which is detected by a split segment photodiode. In a particularly preferred embodiment, the microscope is modified to comprise a high speed electric circuit which couples the photodiode to a imaging system.

Cantilever movement preferably is monitored by the high speed position sensor (e.g., segmented photodiode) described above. Signals from the sensor can be used to determine probe oscillation amplitude, frequency, and phase, as well as other parameters, and to measure the probe-sample interactions based on determined probe parameters. A data acquisition system can use this measurement as a feedback signal to control the relative position of the cantilever and sample so as to keep the cantilever-sample interaction constant during data acquisition. In one aspect, a display device is coupled to a processor receiving information from the data acquisition device which can displays graphic representation of measurements obtained (e.g., a histogram) results in a visual image, such as a histogram.

For data collection, a data acquisition device for writing data to a computer memory is preferably in communication with the detection system of whatever AFM microscope is used, e.g., receiving signals from the segmented photodiode, for example, or from a tunneling electrode. In one aspect, the data acquisition device comprises a PCI board which is used in a standard PC-type computer. In one preferred aspect, the board comprises a variable sampling rate of up to about 100 MHz or faster. Preferably, the board can acquire at least about 8 bit data at its highest speeds, and more preferably, the board can acquire at least about 10, at least about 12, at least about 15, at least about 18, or at least about 20 bit data. A number of suitable software packages may be used to control data acquisition, such as the LabVIEW software package from National Instruments (at http://www.ni.com/support/) to control data acquisition (see, e.g., Heinz et al., 2000, *J. Phys. Chem. B.* 104: 622-626. 2000; Koralek, et al., $AD^-01$. *Phys. Lets.* 76: 2952-2954).

Methods for Using High Performance Cantilevers
Biological Applications

The cantilevers according to the invention are ideal for use in assays which require an evaluation of the surface properties or features of samples, such as biological samples. In one aspect, a cantilever is used in a method for detecting a biochemical reaction, as described in U.S. Pat. No. 5,620,854. The method comprises measuring signals emitted during the time sequence of the reaction using the stationary mode operation of a scanning probe microscope, such as an AFM. The cantilever can be used to process signals emitted directly from the sample or through a medium which contains the sample. By using the AFM device in a stationary mode, the cantilever's tip can be used to measure characteristic motions (e.g., such as vibrations) or acoustic signals (e.g., such as frequencies) created or emitted by a sample (e.g., a cell, biomolecule, and the like). In one aspect, an intermediary molecule (e.g., an enzyme, colloidal particle, gold ball, etc.) is be bound to the sample and the motion of the intermediary molecule is monitored (e.g., by laser interferometry) to monitor the motion of the sample.

The cantilever is used in a contact or non-contact mode to detect such processes as a change in configuration of an enzyme, polymerization, egg fertilization, viral attack on a cell, conformational changes of molecules, appendage motion, replication (cell division), viral attack (membrane motion), the intermolecular transfer of phosphate the interaction of proteins and ligands (e.g., such as drug molecules or other therapeutic agents), the unfolding and refolding of proteins, and other biochemical reactions occurring in, or on, a cell. Preferably, reactions are monitored over time. More preferably, monitoring is performed in a thermally stabilized environment to eliminate temperature-induced drift. However, the temperature or the chemical environment may be changed to slow down rates of reaction to better identify a sequence of reactions.

In one preferred aspect of the invention, a cantilever designed as above is used to image the surface topography of a biological sample (see, e.g., as described in U.S. Pat. No. 5,874,668). Preferably the cantilever is used in conjunction with an optical system as described above.

In one aspect, the hp cantilever is coated with or coupled to an amphipathic molecule, such as a lipid molecule, detergent, zwitterion, and the like. The cantilever may be coated at the tip, along the body of the cantilever, or over a portion of the body of the cantilever and/or tip. Alternatively, or additionally, the cantilever can be coated with a photoactivatable material, a conductive material, a semiconductive material, or a pharmaceutical coating (e.g., comprising a biological molecule for interacting with the sample).

Suitable pharmaceutical coatings include, but are not limited to, an antibody, receptor ligand, enzyme, protein, polypeptide, peptide, antigen, or chemical, that is capable of interacting specifically with a molecule or site on a molecule of interest on a sample. When the cantilever comes into contact with a molecule or portion thereof on the sample which binds to a biological molecule coating the cantilever, a stronger force is needed to separate the cantilever from the sample than when no binding occurs. This force can be measured using AFM to provide information as to the nature of one or more molecule(s) in a sample. Methods of functionalizing cantilevers are known in the art and are described in U.S. Pat. No. 5,874,668, for example.

Functionalized cantilevers can be used in a variety of diagnostic assays to detect unique surface features (e.g., such as molecules expressed) of a biological sample (e.g., a cell, microorganism, a bodily fluid, and the like) which are correlated with disease or an abnormal physiological response. In one aspect, the cantilever comprises a molecule which interacts with a marker of a disease or an abnormal physiological response, and detecting changes between the interaction of the cantilever and the sample is used to identify the presence of the marker in the sample. In one preferred aspect, an array of cantilevers is provided comprising a plurality of cantilevers, each comprising a different binding partner stably associated with the cantilever. This enables high throughput detection of different molecules in a sample.

The cantilevers according to the invention also can be used to screen for molecules which alter the interactions between binding partners, for example, to screen for drugs that modulate receptor:ligand interactions, by contacting the sample with a molecule (e.g., a drug, therapeutic agent or candidate agent) and identifying molecules which alter interactions between the cantilever and the sample.

In another aspect, cantilevers are used in methods for detecting nucleic acid polymerization (e.g., such as DNA replication) (see, e.g., U.S. Pat. No. 6,280,939). Preferably, the cantilever is configured to react to the movement of a polymerase during a polymerization reaction to detect the movement of a growing polynucleotide chain through the polymerase during nucleotide incorporation. More preferably, the cantilever is part of an optical system which comprises a data acquisition device capable of transforming incorporation data into nucleotide data (e.g., to obtain sequence information).

In a further aspect, an oligonucleotide or other nuclear acid probe is deposited on a cantilever and the interaction between the oligonucleotide and a nucleic acid in a sample is monitored by detecting stress on the cantilever at a particular site (see, e.g., U.S. Pat. No. 6,203,983) (e.g., at one or more locations on a substrate comprising a plurality of nucleic acids stably associated therewith).

In another aspect, cantilevers according to the invention are used to map surface features of molecular libraries (e.g., a nucleic acid library; protein, polypeptide, or peptide library, an antigen library, a small molecule library, and the like) as described in U.S. Pat. No. 6,287,765. The specific binding affinities of members of a molecular library may be determined and correlated with the known address a library member on a substrate to identify library members with desired characteristics (e.g., binding affinities). In one aspect, an array of cantilevers is used to interrogate different members of the library.

In a preferred aspect of the invention, cantilevers are used to evaluate the dynamics of lipid bilayer fusion. Important cellular processes such as endo- and exocytosis, vesicular trafficking, synapse function, pinocytosis, and fertilization depend on the successful interactions, including fusion, between lipid bilayers. In one aspect, therefore, a cantilever tip is coated with a lipid bilayer and brought into contact with a lipid bilayer on a surface or substrate (which may be the same type or a different type of lipid bilayer). The lipid bilayer on the surface may be provided in the form of a cell, a cell membrane fraction, an organelle fraction, or a reconstituted cell membrane fraction. The two bilayers are pressed together to compel fusion, and the associated forces are measured. The dynamics at the cantilever can then be used to evaluate the dynamics of membrane fusion.

By using an AFM system as described above, different steps of the fusion process can be dissected and the time course of these steps monitored. In one preferred aspect, the dynamics of membrane fusion of a membrane fraction from a diseased cell is examined to correlate changes in membrane dynamics with abnormal physiological responses. In another aspect, a bilayer (e.g., from a cell, cell membrane fraction, and the like) sample is contacted with an agent to evaluate the effect of the agent on the dynamics of membrane fusion. In a further aspect, the effect of the agent is correlated with changes in membrane dynamics associated with an abnormal physiological response, i.e., to determine the ability of the agent to restore the normal properties of the membrane.

Non-Biological Applications

Cantilevers also can be used in a variety of non-biological applications. For example, the cantilevers can be used to measure mechanical properties of a sample (e.g., by nano-indentation, scratch tests, force modulation, and the like). Atomic force microscopy also can be used to fabricate nanostructures (e.g., on silicon wafers, thin film magnetic read/write heads, and the like) (see, e.g., U.S. Pat. No. 6,337,479) or to evaluate the properties of these nanostructures.

In one aspect, a cantilever according to the invention is used to obtain "vertical metrology" measurements, e.g., to determine tolerances of data storage devices and semiconductor devices. For example, the cantilevers can be used to measure the of the recession of the pole tips of a recording head of a hard disk drive. The pole tips are the portions of the sensing or read/write element of the recording head which interface magnetically with the recording medium. During operation, it is desirable to minimize the spacing between the pole tips and the magnetic layer of the hard disk, thereby maximizing the signal-to-noise ratio obtained from the read element and the density of the data that can be written to the disk. Vertical metrology data can be obtained as is described in U.S. Pat. No. 5,898,106, for example.

Cantilevers also can be used to create surface features on a substrate. For example, cantilevers can be used to create ultra high density storage media. AFM comprising a cantilever according to the invention can be used to move atoms or molecules around on an electrically conductive surface (i.e., substrate) by moving the tip of the cantilever to a position adjacent to the atom or molecule to be moved and subsequently increasing the attraction between the tip and the atom or molecule by moving the tip closer to the surface. Then, while the atom or molecule remains bound to the tip and to the surface of the substrate, the tip is moved laterally to drag the atom or molecule to a desired position on the substrate surface. The tip can then be moved away from the surface, reducing the attraction between the atom or molecule and tip, and leaving the atom or molecule bound at the desired position. Methods of generating data structures using cantilevers are described in U.S. Pat. No. 6,236,589, for example. By using an array of high performance cantilevers, very high density structures can be fabricated.

It should be obvious to those of skill in the art that the methods described above are non-limiting and that the cantilevers according to the invention can be used in any methods relying on cantilevers which are know in the art or which may be designed in the future and that such methods are encompassed within the scope of the instant invention.

EXAMPLES

The invention will now be further illustrated with reference to the following examples. It will be appreciated that what follows is by way of example only and that modifications to detail may be made while still falling within the scope of the invention.

Example 1

FIB Generated Cantilever

To make rectangular cantilevers, a starting material comprising a straight beam-shaped B Microlever with a nominal resonant frequency of 15 kHz in air and a nominal force constant of 0.02 N/m. After milling, the resonant frequency of one of the cantilevers provided in this way (cantilever 1) in air increased to 126 kHz, and in water the resonant frequency increased from 3.5 kHz to 51 kHz (Table 2). In both cases, there is a peak centered at zero frequency due to 1/f and other electronic noise. The force constant increased to 0.20 N/m.

The resonant frequency of a cantilever 2 produced by this method was increased by a similar amount, i.e., to 106 kHz in air and 42 kHz in water. The small difference between cantilevers 1 and 2 is probably due to the slightly longer legs of cantilever 2. Note that the ratio $\omega_s/\omega_v$ improved in the modified cantilevers, and is ~0.4 compared with 0.25-0.3 for unmodified cantilevers.

To make a V-shaped cantilever (cantilevers 3-5), a starting material was selected which was a V-shaped F Microlever, with a nominal resonant frequency of 120 kHz in air and a nominal force constant of 0.5 N/m. After milling, the resonant frequency of a cantilever 4 produced in this way in air remained nearly unchanged (123 kHz). However, the resonant frequency in water increased to 54 kHz, while the force constant decreased to 0.30 N/m. Here $\omega_s/\omega_v$ improved to 0.44. Similar results were obtained for cantilevers 3 and 5.

Figure 2E:
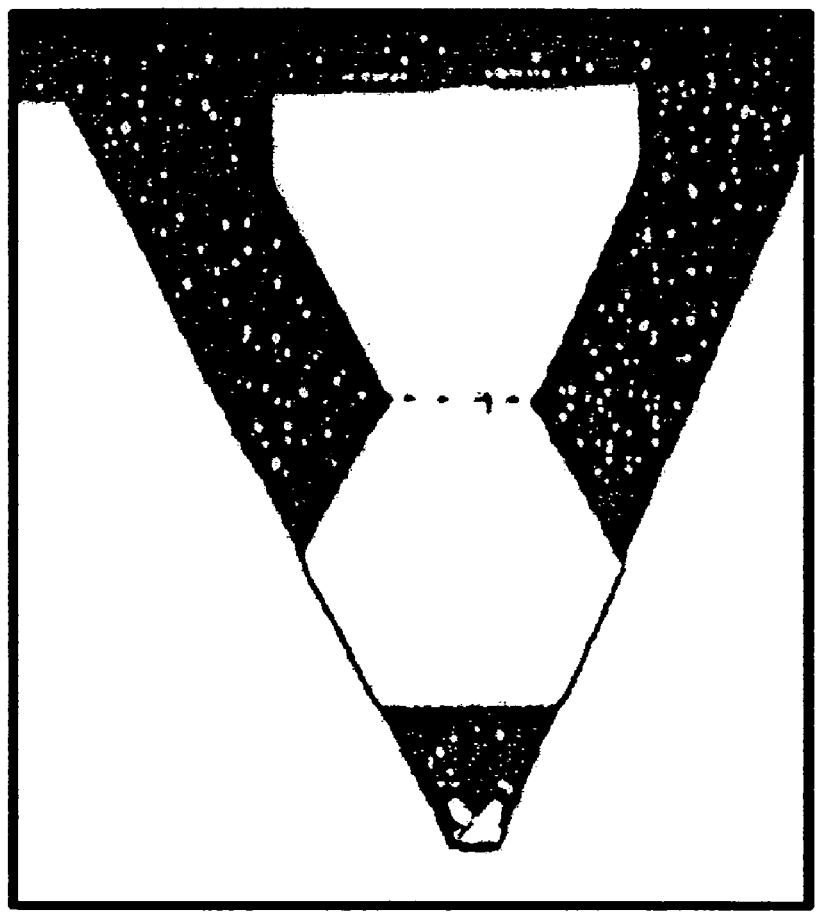
Figure 2D:
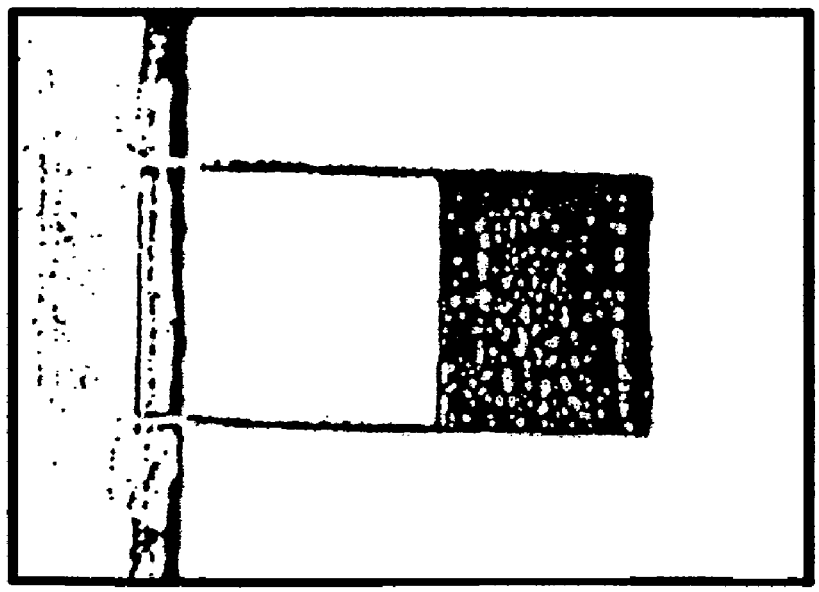
Figure 2F:
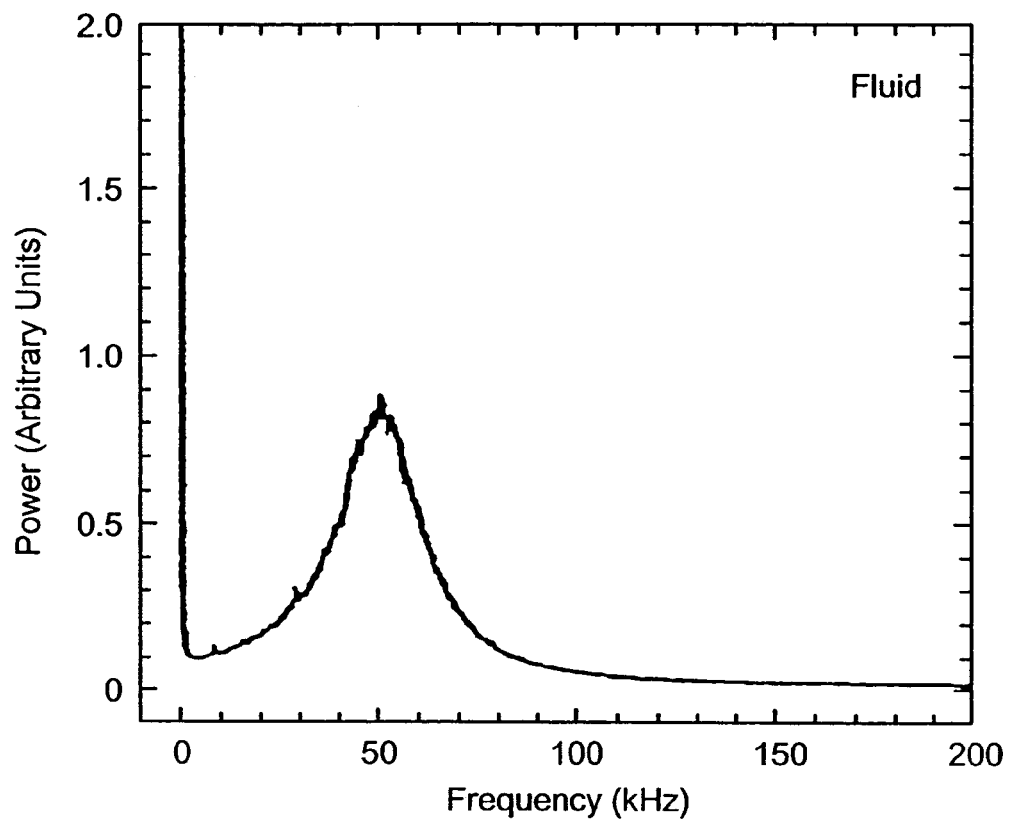
Figure 2G:
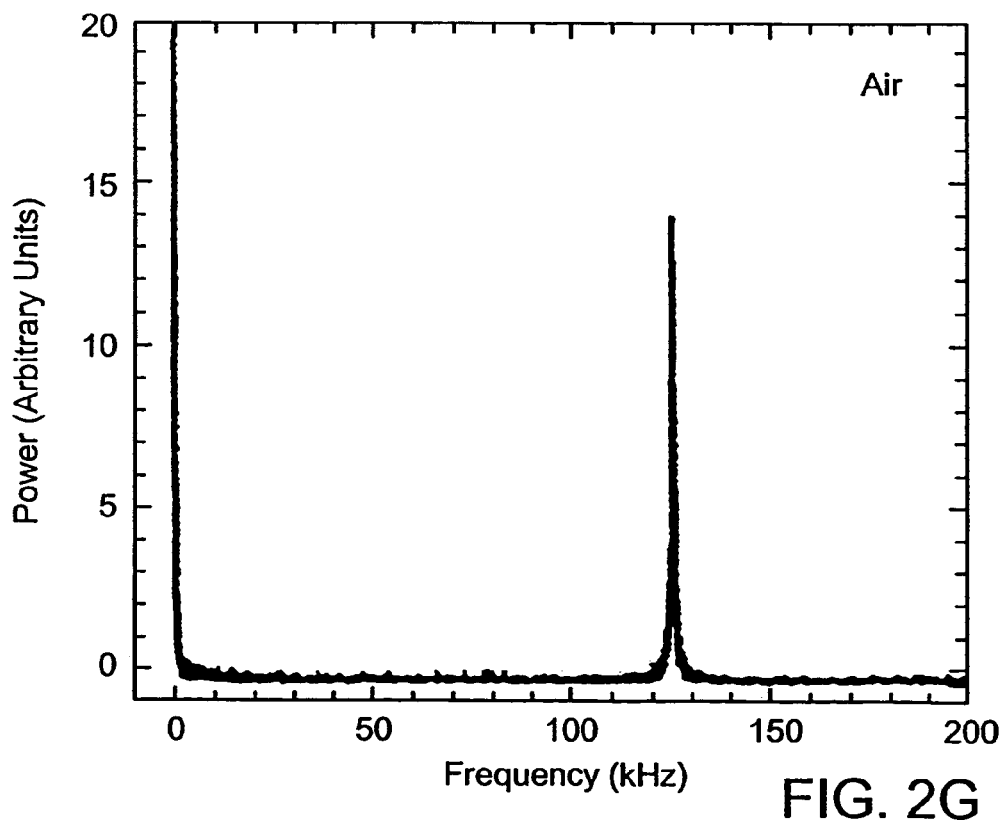
Figure 2H:
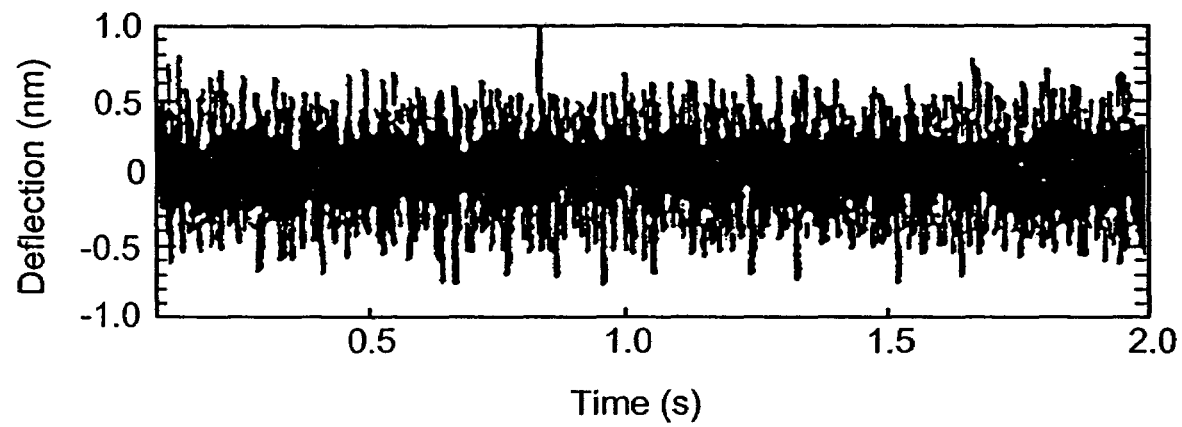
Figure 2I:
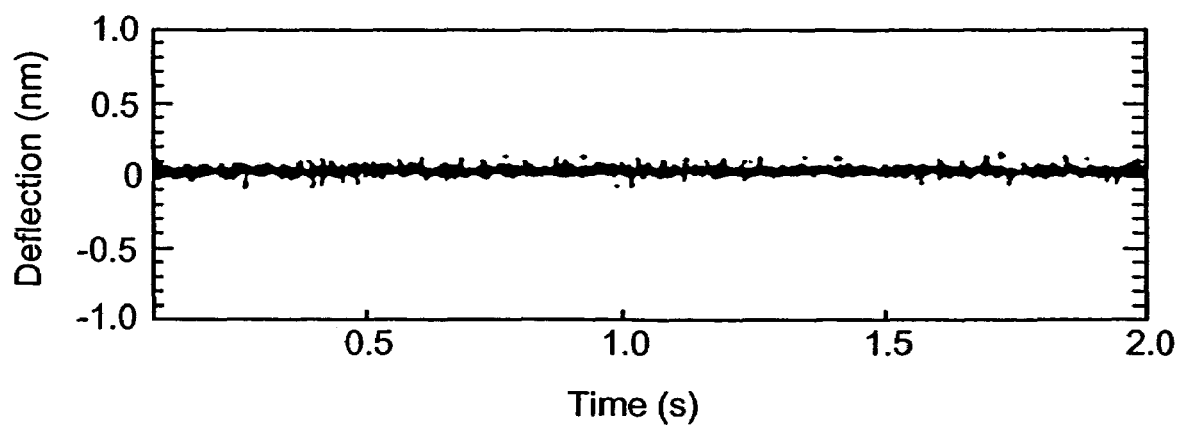

The deflection due to thermal fluctuations of modified cantilevers in water to that of unmodified cantilevers with similar spring constants was compared. The reduced dimensions of the cantilevers led to improved noise characteristics. Over a bandwidth of 100 Hz-10 kHz, the thermal noise was lower for cantilever 1 than for a conventional E Microlever (FIGS. 2H-I). The RMS thermal deflection of cantilever 1 in this bandwidth was 0.032 nm, while the RMS deflection of the E cantilever was 0.22 nm. Since the total thermal noise of a cantilever scales as $k^{-1/2}$, part of the decrease in thermal noise comes from the higher spring constant of cantilever 1 (0.20 N/m, as compared to 0.11 for the E cantilever). However, this leads to an expected reduction to 74% of the higher value. Most of the reduction in noise over this bandwidth is due to increased resonant frequency. The RMS deflection over this bandwidth is similar to that of a conventional F Microlever (0.029 nm). The F Microlever has a nominal spring constant of 0.5 N/m, more than twice that of cantilever 1.

In one aspect, a rectangular cantilever (FIG. 2D) was milled from a simple beam-shaped cantilever with a length of 200 μm, a width of 20 μm, and a nominal thickness of 0.6 μm (the B-type Microlever). The length was truncated to 35 μm. The beam-shaped cantilever was then milled to form a square at the base, leaving two legs of approximately 0.75 μm in width and 20 μm in length. A 15 μm×20 μm rectangular pad was left at the end of the legs in order to reflect the laser beam onto the photodiode. Note that this cantilever has no tip, although one could readily be added by electron beam deposition.

A V-shaped cantilever (FIG. 2E) was made by starting with a commercial V-shaped cantilever with a length of 85 μm from base to free end, a leg width of 18 μm, and a nominal thickness of 0.6 μm (the F-type Microlever). This was modified to produce two legs that were approximately 1 μm wide and 20 μm long, leaving the tip and a sufficient surface area for an optical lever at the free end (FIG. 2E). Large portions of the original legs were left in place, so that the final cantilever was a compound structure.

Generally, before milling, the cantilevers were sputter-coated with ~3 nm of chromium to eliminate charging effects, then mounted to aluminum stubs with conductive silver paint. The milling was performed in an FEI FIB-200/xp focused ion beam workstation with a 30 kV Ga$^+$ ion beam, and a beam current of 150 pA (FEI, Hillsboro, Oreg.).

Several cantilevers of each type were milled, and the resonant frequency in air and fluid, as well as the thermal noise characteristics, of each cantilever was determined (see, Table 2). The cantilevers were mounted in a standard ambient or fluid tapping cell. Measurements were performed using a Multimode AFM with a Nanoscope IIIa controller equipped with a Signal Access Module (Digital Instruments, Santa Barbara, Calif.). Cantilever deflection voltages were collected with a custom data acquisition system, and the data analyzed using custom software written in Interactive Data Language (Research Systems, Inc., Boulder, Colo.) (see, e.g., Heinz, et al., 2000, *J. Phys. Chem. B.* 104: 622).

To determine the resonant frequency, the raw cantilever deflection signal was sampled at 1 MHz, high-pass filtered above 100 Hz to remove low frequency electronic noise, and used to calculate the power spectral density. Resonant frequency was also measured with the Digital Instruments frequency tuning software, and checked to ensure that it was consistent with the previous result.

Thermal noise was tested in a similar fashion. The raw deflection signal of a free cantilever in pure water was band-pass filtered from 100 Hz to 10 kHz, and the root mean square (RMS) deflection was calculated. For several of the cantilevers, the force constant was also measured using an independently calibrated reference cantilever (CLFC-NOBO; ThermoMicroscopes) (see, Gibson, et al., 1996, *Nanotechnology* 7: 259 (1996).

A summary of the properties of the cantilevers so produced is shown in Table 2 below.

TABLE 2

Properties of Cantilevers*

| Cantilever | Type | k (N/m) | $F_0$ air (kHz) | $F_0$ fluid (kHz) | RMS Noise (nm) |
|---|---|---|---|---|---|
| 1 | rectangular | 0.20* | 127 | 50.6 | 0.032 |
| 2 | rectangular | N/D | 106 | 42.4 | 0.036 |

TABLE 2-continued

Properties of Cantilevers*

| Cantilever | Type | k (N/m) | $F_0$ air (kHz) | $F_0$ fluid (kHz) | RMS Noise (nm) |
|---|---|---|---|---|---|
| 3 | V-shaped | N/D | 136 | 62.5 | 0.067 |
| 4 | V-shaped | 0.30* | 123 | 53.9 | 0.032 |
| 5 | V-shaped | N/D | 123 | 53.0 | N/D |
| E | V-shaped | 0.11** | 35.9 | 7.8 | 0.220 |
| F | V-shaped | 0.5# | 122 | 38.0 | 0.029 |

*Summary of force constant (k), resonant frequency in air and fluid ($F_0$), and RMS noise deflection from 100 Hz-10 kHz in pure water for 5 modified cantilevers and 2 conventional cantilevers (E and F Microlevers, ThermoMicroscopes).
**Tested using reference spring method.
Nominal force constant reported by manufacturer.
N/D: Not determined.

Example 2

Generation of Cantilevers by Electron Beam Deposition

High performance cantilevers were grown on the end of conventional silicon nitride cantilevers or near the apex of high force constant Si-cantilevers. The silicon nitride cantilevers were V-shaped and 83 µm from based to free end, with a nominal force constant of 0.5 N/m. The Si-cantilevers were straight beams 125 um long with a force constant of 10-50 N/m. The cantilevers were mounted on a standard scanning electron microscope (SEM) mount, with the cantilever pointing toward the electron beam. An Amray 1810 SEMI equipped with a tungsten filament source was used. The microscope was operated at 30 kV using a condenser lens setting of 14, at 40,000 to 60,000× magnification and working distance of ~10 mm.

Electron beam deposited cantilevers up to 12 µm in length were constructed, with the only obvious limit being patience of the SEM operator (FIG. 1A). On a standard SEM, the mechanical drift in the system required adjustment of the beam every 1-5 minutes, over the time course of 3-5 hours for a 10 µm cantilever. Further, the growth of the cantilever required frequent refocusing to maintain a small spot at the growing end of the cantilever. The cantilevers generated by this method had a somewhat irregular tapered shape, with a diameter at the base typically less than 1 um and a diameter at the free end of 100-300 nm.

Other variants of this type of cantilever included constructing very small cantilevers near the apex of the tip of a Si-cantilever (FIG. 1B) and the addition (by electron beam deposition) of a pad in the middle of the cantilever (FIG. 1C). The high performance cantilevers were produced from this starting material using the smallest and most well-focused electron beam possible. The tapered structure is inadvertent and may results from surface diffusion of activated molecules out of the irradiation volume, or from out of focus electron irradiation along the length structure; however, it does not significantly impact the performance properties of the cantilever.

Variations, modifications, and other implementations of what is described herein will occur to those of ordinary skill in the art without departing from the spirit and scope of the invention.

All patents, patent applications, and references cited herein are incorporated in their entireties herein.

What is claimed is:

1. A cantilever for use in a scanning probe microscope comprising a width to thickness ratio of about 3:1 or less and which is smaller in at least one dimension than about 5 µm, and wherein the cantilever comprises a spring constant between $1 \times 10^{-6}$ and 0.1 N/m.

2. The cantilever according to claim 1, wherein the cantilever has a resonant frequency equal to or above 10 kHz.

3. The cantilever according to claim 1, wherein the cantilever has a resonant frequency equal to or above 100 kHz.

4. The cantilever according to claim 1 wherein the cantilever comprises silicon, silicon nitride, silicon dioxide, a metal, a plastic, and a silicon-based rubber.

5. The cantilever according to claim 4, wherein the metal is selected from gold, aluminum, silver and nickel.

6. The cantilever according to claim 4, wherein the silicon-based rubber is PDMS.

7. The cantilever according to claim 1, wherein the cantilever comprises a reflective portion and/or comprises a conductive material.

8. The cantilever according to claim 1, wherein the cantilever comprises a width to thickness ratio of about 1:1 or less.

9. A method for measuring a property of a sample, comprising: detecting an interaction between a cantilever according to claim 1 and the sample, wherein the interaction provides a measure of the property of the sample.

10. The method according to claim 9, wherein the property comprises one or more surface features of the molecule.

11. The method according to claim 9, wherein the cantilever further comprises one or more biological molecules and wherein the one or more biological molecules interact with one or more molecules of the sample.

12. The method according to claim 11, wherein the biological molecule binds to the one or more molecules.

13. The method according to claim 11, wherein the one or more biological molecules is selected from the group consisting of: nucleic acids, proteins, polypeptides, peptides, receptors, ligands, enzymes, antigens, drug molecules, therapeutic agents, lipids, lipid bilayers, detergents, a cell membrane fraction, organelles, and zwitterions.

14. The method according to claim 11, wherein the nucleic acid is selected from the group consisting of: a DNA molecule, RNA molecule, antisense molecule, ribozyme, triple helix forming molecule, an aptamer; and combinations and modified forms thereof.

15. The method according to claim 14, wherein the sample comprises one or more a cell, nucleic acids, proteins, polypeptides, peptides, receptors, ligands, enzymes, antigens, drug molecules, therapeutic agents, lipids, a cell membrane fraction, organelles, and microorganisms.

16. The method according to claim 14, wherein the property of the sample comprises one or more of: surface topography, binding, a chemical reaction, a cellular response, or polymerization.

17. A cantilever for use in a scanning probe microscope according to claim 1, wherein the width to thickness ratio reduces damping of the cantiler's resonant frequency.

18. A method for producing a cantilever comprising: (a) providing a starting material; (b) exposing the starting material to an ion beam; and (c) removing molecules from the starting material to generate a cantilever which has a width to thickness ratio of about 3:1 or less, and which is smaller in at least one dimension than about 5 µm, and wherein the cantilever comprises a spring constant between $1 \times 10^{-6}$ and 0.1 N/m.

19. The method according to claim 18, further comprising imaging the starting material at one or more time intervals.

20. The method according to claim 18, wherein the starting material comprises silicon, silicon nitride, silicon dioxide, or a metal.

21. The method according to claim 18, wherein the cantilever comprises a resonant frequency above at least about 10 kHz.

22. The method according to claim 18, wherein the cantilever comprises a resonant frequency above at least about 100 kHz.

23. The method according to claim 18, wherein the starting material is a beam, a film, a sheet, a V-shaped material, or a rectangular shaped material.

24. The method according to claim 18, wherein the starting material is a cantilever.

25. The method according to claim 18, further comprising a step of generating a tip at an end of the cantilever.

26. The method according to claim 18, wherein the tip is generated by electron beam deposition.

27. The method according to claim 18, wherein the cantilever comprises a reflective surface.

28. The method according to claim 18, wherein the starting material is a conductive material.

29. A cantilever for use in a scanning probe microscope comprising a width to thickness ratio of about 3:1 or less and which is smaller in at least one dimension than about 5 µm and which is larger in at least one dimension than about 20 nm, and wherein the cantilever comprises spring constant between $1 \times 10^{-6}$ and 0.1 N/m.

* * * * *